(12) United States Patent
Tehrani

(10) Patent No.: US 9,386,381 B2
(45) Date of Patent: Jul. 5, 2016

(54) VEHICLE COMMUNICATION WITH A HEARING AID DEVICE

(71) Applicant: GM Global Technology Operations LLC, Detroit, MI (US)

(72) Inventor: Saeid Tehrani, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 75 days.

(21) Appl. No.: 14/302,116

(22) Filed: Jun. 11, 2014

(65) Prior Publication Data

US 2015/0365771 A1 Dec. 17, 2015

(51) Int. Cl.
*H04R 25/00* (2006.01)
*B62D 63/00* (2006.01)

(52) U.S. Cl.
CPC .............. *H04R 25/554* (2013.01); *B62D 63/00* (2013.01); *H04R 2499/13* (2013.01)

(58) Field of Classification Search
CPC ........... H04R 2225/41; H04R 2225/43; H04R 25/43; H04R 25/554; H04R 25/556; H04R 25/558
See application file for complete search history.

(56) References Cited

U.S. PATENT DOCUMENTS

| | | | | |
|---|---|---|---|---|
| 7,072,480 | B2 * | 7/2006 | Rass .................... | H04R 25/407 381/314 |
| 2010/0322448 | A1 * | 12/2010 | Waldmann ........... | H04R 25/558 381/314 |
| 2011/0224976 | A1 * | 9/2011 | Taal ........................ | G10L 25/69 704/205 |
| 2012/0148077 | A1 * | 6/2012 | Aldaz .................. | H04R 25/558 381/315 |
| 2013/0329924 | A1 * | 12/2013 | Fleizach .............. | H04R 25/558 381/314 |
| 2015/0365771 | A1 * | 12/2015 | Tehrani ................ | H04R 25/554 381/315 |

* cited by examiner

*Primary Examiner* — Matthew Eason
(74) *Attorney, Agent, or Firm* — Christopher DeVries; Reising Ethington, P.C.

(57) ABSTRACT

A vehicle communications system and a method utilizing that system that provides audio within a vehicle cabin compartment to a hearing aid system. The method includes the steps of establishing a wireless connection via short range wireless communication (SRWC) between the hearing aid system and a vehicle audio system; and providing first audio from the audio system to the hearing aid system via the SRWC.

14 Claims, 3 Drawing Sheets

VEHICLE COMMUNICATION WITH A HEARING AID DEVICE

TECHNICAL FIELD

The present invention relates to short range wireless communication within a vehicle, and more particularly, to short range wireless communication with an occupant's hearing aid.

BACKGROUND

A hearing aid or instrument may be a purely acoustic device or an electro-acoustic device configured to amplify sounds for the user. Hearing aids are suitable for persons having some degree of hearing loss. For example, persons having a normal degree of hearing loss may be associated with the inability to detect sounds between −10 to 15 decibels (dB). On the other hand, slight hearing loss may be associated with the inability to detect sounds between 16 to 25 dB, mild hearing loss may be associated with the inability to detect sounds between 26 to 40 dB, moderate hearing loss may be associated with the inability to detect sounds between 41 to 55 dB, moderately severe hearing loss may be associated with the inability to detect sounds between 56 to 70 dB, severe hearing loss may be associated with the inability to detect sounds between 71 to 90 dB, and profound hearing loss may be associated with the inability to detect sounds greater than 91 dB.

SUMMARY

According to an embodiment of the invention, there is provided a method of providing audio within a vehicle cabin compartment to a hearing aid system. The method includes the steps of: establishing a wireless connection via short range wireless communication (SRWC) between the hearing aid system and a vehicle audio system; and providing first audio from the audio system to the hearing aid system via the SRWC.

According to another embodiment of the invention, there is provided a method of providing audio within a vehicle cabin compartment to a hearing aid system. The method includes the steps of: establishing a wireless connection via short range wireless communication (SRWC) between the hearing aid system and a vehicle audio system; providing first audio from the audio system to the hearing aid system via the SRWC; providing second audio from the audio system to the cabin compartment of the vehicle; receiving background audio and the second audio at the audio system via one or more microphones in the vehicle; and adjusting at least one of the first audio, the second audio, or the background audio in order to improve the audio quality perceived by a user of the hearing aid system in the vehicle.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to providing audio to a vehicle occupant wearing a hearing aid. The present disclosure includes wirelessly providing audio to the hearing aid from a vehicle head unit (e.g., described herein as a vehicle multi-tainment unit, i.e., providing multiple services such as entertainment and infotainment related services). One or more audio parameters (e.g., volume, frequency, etc.) of the hearing aid may be adjusted manually using the VMU or may be adjusted automatically based on other sound within the vehicle cabin—e.g., ambient vehicle noise and/or audio provided via the cabin speakers.

Before discussing the various method embodiments, an example of the communications system used by the method(s) first will be discussed. It should be appreciated that the communications system described below is merely an example, and that other communications systems or system variations may be used as well.

Communications System

Figure 1:
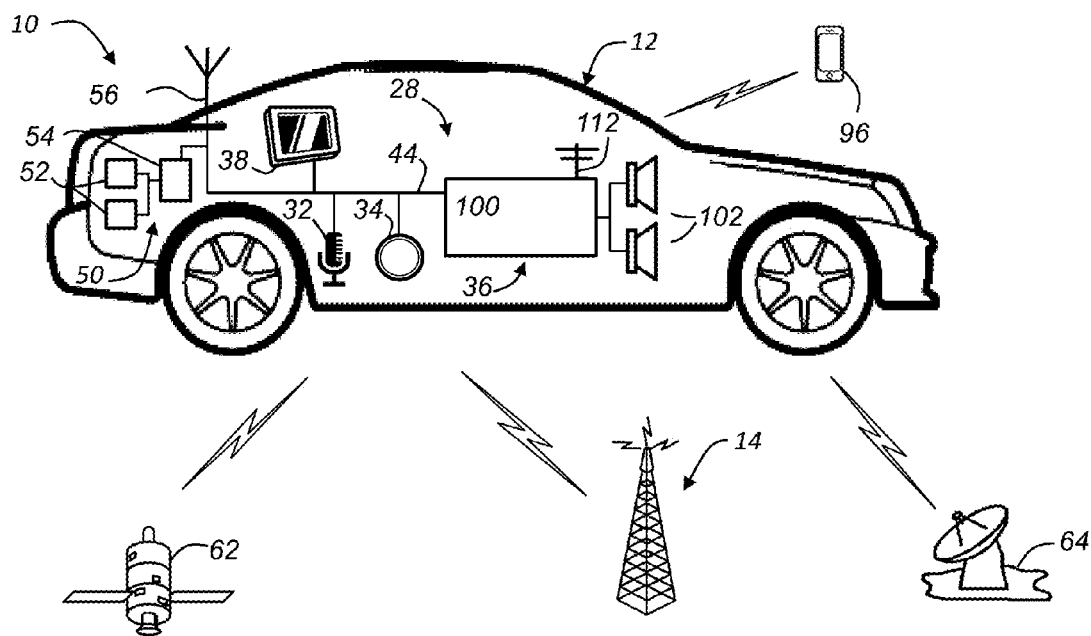
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14 that may be used for cellular communication with the vehicle 12 via an embedded telematics system (not shown), one or more communication satellites 62, and/or one or more transmitting stations 64. Thus, it should be appreciated that communication with the vehicle 12 may be uni-directional or bi-directional. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14. In general, the architecture, construction, setup, and operation of the system 10 and its individual components are generally known in the art.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Further, the vehicle 12 may be configured for both long-range communication (e.g., including cellular (GSM, CDMA, LTE, etc.), satellite, other RF, etc.) and short range wireless communication (SRWC). SRWC is intended to be broadly construed and may include one or more suitable wireless protocols including any Wi-Fi standard (e.g., IEEE 802.11), Wi-Fi Direct or other suitable peer-to-peer standard, Bluetooth, wireless infrared transmission, WiMAX, ZigBee™, and/or various combinations thereof.

Vehicle 12 may comprise various vehicle electronics 28 that includes a number of vehicle user interfaces that provide vehicle occupants with a means of providing and/or receiving information, including microphone 32, manual control(s) 34 (e.g., pushbuttons, dials, knobs, switches, etc.), audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 may provide audio input to the vehicle head unit (described below) to enable the driver or other occupant to provide voice commands and carry out hands-free calling via the wireless carrier system 14. For this purpose, it can be connected to an on-board automated voice processing unit utilizing human-machine interface (HMI) technology known in the art. The control(s) 34 allow manual user input into the head unit to initiate and provide data, response, or control input. Separate control(s) 34 can be used for initiating emergency calls versus regular service assistance calls to the call center (not shown). Audio system 36 provides audio output to a vehicle occupant and can be a dedicated, stand-alone system or part of the primary vehicle audio system. According to the particular embodiment shown here, audio system 36 may be operatively coupled to a vehicle bus 44 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Figure 2:
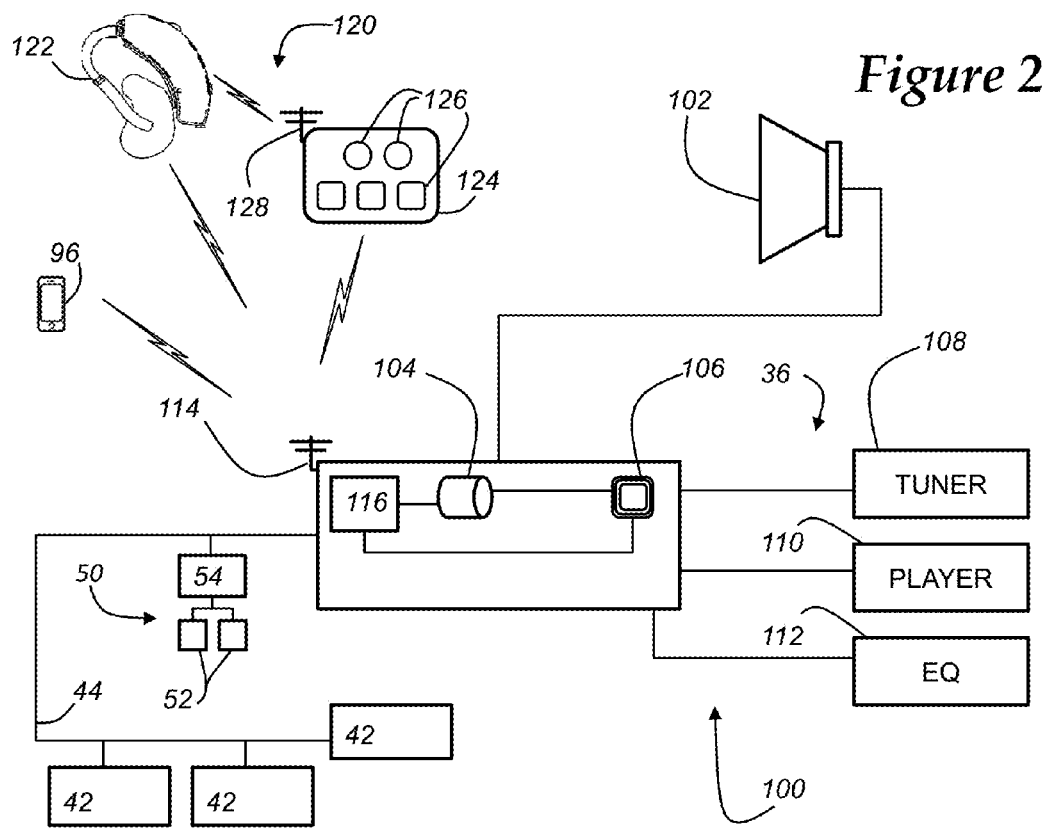
FIG. 2 is a block diagram depicting an embodiment of a vehicle audio system.
Figure 3:
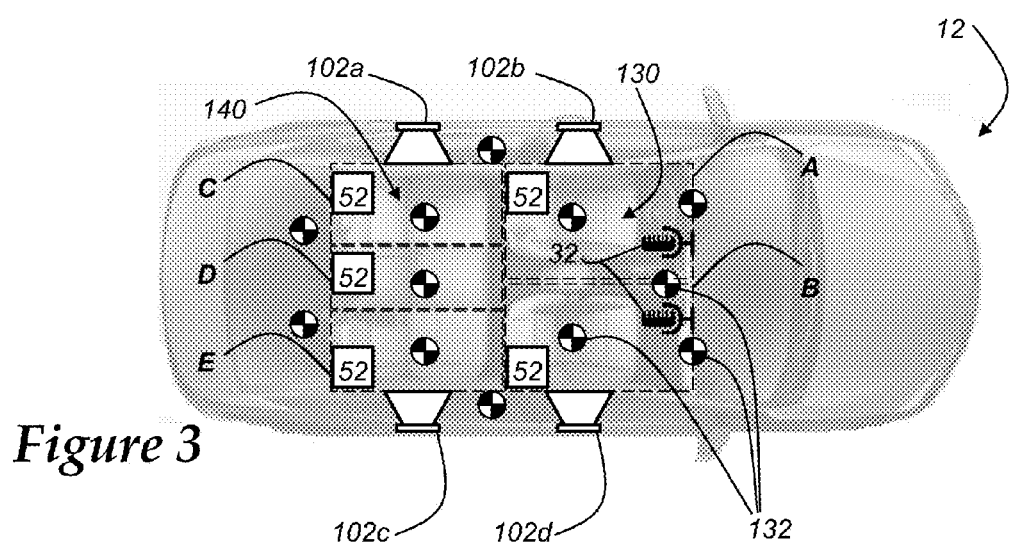
FIG. 3 is a schematic view of a vehicle cabin compartment.

At least some of the vehicle electronics 28 include the audio system 36 (as shown in FIGS. 1 and 2) that may include a vehicle multi-tainment unit (VMU) or vehicle head unit or deck 100 and one or more sound speakers 102 coupled thereto (e.g., by wire or wirelessly). The VMU 100 may include all suitable electronics, software, etc. for providing vehicle entertainment and vehicle infotainment services to the vehicle users and/or occupants including memory 104 coupled to a processor or processing device 106. Also, the VMU may include or be coupled to a tuner 108 (e.g., tunable to AM, FM, Satellite, etc. radio), a player 110 (e.g., for playing CD, DVD, Blu-ray, other suitable media including digitally stored media such as MP3, AAC, WMA, etc.), and an equalizer (EQ) 112. The equalizer 112 With regard to the sound speakers 102, various implementations are possible. FIG. 3 illustrates one such example (depicting speakers 102*a*, 102*b*, 102*c*, and 102*d*); it should be appreciated that other examples are also possible.

The equalizer 112 may be any device for adjusting the balance between frequency components of an electronic audio signal. Thus, the equalizer 112 may strengthen (boost) or weaken (cut) the intensity or energy levels of predetermined frequencies (or frequency bands). The number of frequency bands will vary depending on the characteristics of the particular equalizer; however, any number of adjustable bands are contemplated herein. The equalizer 112 may be a component of the VMU 100 or may be a separate unit. And for example, adjustments may be made via the equalizer 112 itself or via the VMU 100. For example, the VMU may be used to control the equalizer 112—according to user input to the VMU or according to a VMU-automated control mode.

In some instances, the VMU 100 may be modular or may be embedded within the vehicle 12. In addition, the VMU 100 may be integrated (e.g., a fixture) within the vehicle or in some circumstances may be detachably fixed or detachably tethered. Where the VMU 100 is detachable, the device may be operable both inside and outside of the vehicle. Furthermore, the VMU 100 may have an antenna 114 coupled to a SRWC module 116 therein (e.g., a Bluetooth or Wi-Fi Direct module or chipset). Examples of VMUs include interactive displays in the vehicle instrument panel, interactive displays embedded within the backing of vehicle seating or the vehicle headliner, and other interactive vehicle devices/displays that are portable.

In some embodiments, portions of the vehicle electronics 28 may be part of the audio system 36; e.g., the microphone 32, the control(s) 34, the visual display 38, etc. In other embodiments, the audio system 36 may comprise independent or dedicated displays, microphones, etc. In some instances, one or more microphones 32 may be configured for use in a feedback technique; e.g., configured to receive current background vehicle audio and/or ambient (or cabin) audio. As used herein, background audio includes vehicle or engine noise, vocal audio (e.g., speech from vehicle occupants, handheld electronic devices (e.g., gaming devices, toys, cell phones, etc.), other environmental noises from outside the vehicle cabin such as road noise, wind noise, rain or other weather noise, etc.). As used herein, ambient audio includes the background audio plus audio contributed by or originated from the VMU or other audio system 36 device (e.g., via speakers 102). Suitable hardware and software to implement these vehicle electronics features will be apparent to skilled artisans.

The vehicle electronics 28 may also include a system or network 130 of one or more sensors 132 (as shown in FIG. 3). The sensors 132 may include proximity sensors, temperature sensors, mechanical shock and/or vibration sensors, acoustic sensors, tactile or contact sensors, etc. The inputs to these sensors may be received by the VMU 100 (e.g., via bus 44) which thereby may determine the location of one or more vehicle users within the vehicle. It should be appreciated that vehicle system modules (VSMs) 42 (shown in FIG. 1)—e.g., electronic control units known to skilled artisans for various vehicle subsystems typically connected to a vehicle bus, such as bus 44—may receive and/or process signals from the network 130 and thereafter provide the signal or indication to the VMU 100 (e.g., again, via bus 44 or the like). In any event, the VMU 100 ultimately may receive the signal(s) or indication (s) from the sensors 132.

In one embodiment, an occupant-location VSM 42 is on-board the vehicle 12 and in communication with at least a portion of the sensors 132. The occupant-location VSM may determine the location of a vehicle user wearing a hearing aid system 120 and provide this data to the VMU 100. Examples of sensors 132 in the vehicle 12 include: seat belt sensors, seat pressure sensors, instrument panel sensors, microphones, touch sensors, and any other suitable sensors or indicator that, as will be described below, may provide an indication of the location of a user of the hearing aid system 120 (described below). Sensors should be construed broadly and should include any device receiving electronic feedback indicative of the location of the hearing aid system 120, including transmission times, lags, delays, etc. pertaining to SRWC transmission (TX) and reception (RX).

In one embodiment (see FIGS. 1 and 2), the vehicle electronics 28 further may comprise an active audio suppression system 50 which may include multiple suppressing devices 52 coupled to an electronic control module 54. The system 50 may be coupled to the bus 44 and may cancel background or ambient audio or other noise in various vehicle cabin locations (e.g., see FIG. 3).

In at least one embodiment, the operating environment may further comprise the hearing aid system 120 that includes a hearing aid or instrument for the hearing-impaired 122. The hearing aid 122 may include any electronic device that may be coupled to the human ear of a vehicle user or any device having a human interface that improves the audio quality of the vehicle user (despite the user's hearing capability). Thus, while an aid for the hearing impaired is shown; other hearing devices (not for the hearing impaired) are possible. The hearing aid 122 may include various electronics including a processor, memory, filters, amplifiers, battery power, and other components known to those skilled in the art.

In at least one embodiment, the hearing aid system 120 further comprises a remote device 124 having one or more controls 126 and an antenna 128. The remote device may be configured at least to communicate with and control the hearing aid 122 by wire or wirelessly. In addition, the remote device 124 may be configured for short range wireless communication (SRWC) with other suitable and compatible electronic devices. Using the controls 126 on the remote device, a user fitted with the hearing aid 122 may be able to adjust the volume up and down, select pre-configured background noise profiles, connect to other SRWC devices, receive direct external audio from recognized SRWC devices, etc. Pre-configured background noise profiles may include enhanced noise filtering programs for predetermined noise environments (e.g., a normal mode profile, a party mode profile, a stadium or concert mode profile, etc.). One commercially available implementation of the remote device 124 is the miniTek™ by Siemens. However, as also described below, it should be appreciated that embodiments exist without use of the device 124.

The hearing aid system 120 and the vehicle 12 may be used together by a person known as the vehicle user such as a vehicle driver or a vehicle passenger or occupant. However, the vehicle user does not need to have ownership of the hearing aid system 120 or the vehicle 12 (e.g., the vehicle user may be an owner or a licensee of either or both).

Methods

Returning to the vehicle 12 shown in FIG. 3, the vehicle includes a cabin or cabin compartment 140 that is divided into occupant zones A, B, C, D, and E. It should be appreciated that the cabin and the indicated zones are merely illustrative. The zones are correlated to the available seating in the cabin 140; however, this is not necessary. Further, while zones A, B, C, D, and E are adjacent to one another, this also is not required but merely an example. In some implementations, the zones may at least partially overlap or be spaced from one another. In FIG. 3, zones A, B, C and E each have a speaker—102b, 102d, 102a, and 102c, respectively. As will be explained below, the sound from the speakers 102a, 102b, 102c, 102d may be controlled in accordance with the use of the previously-described hearing aid system 120.

Figure 4:
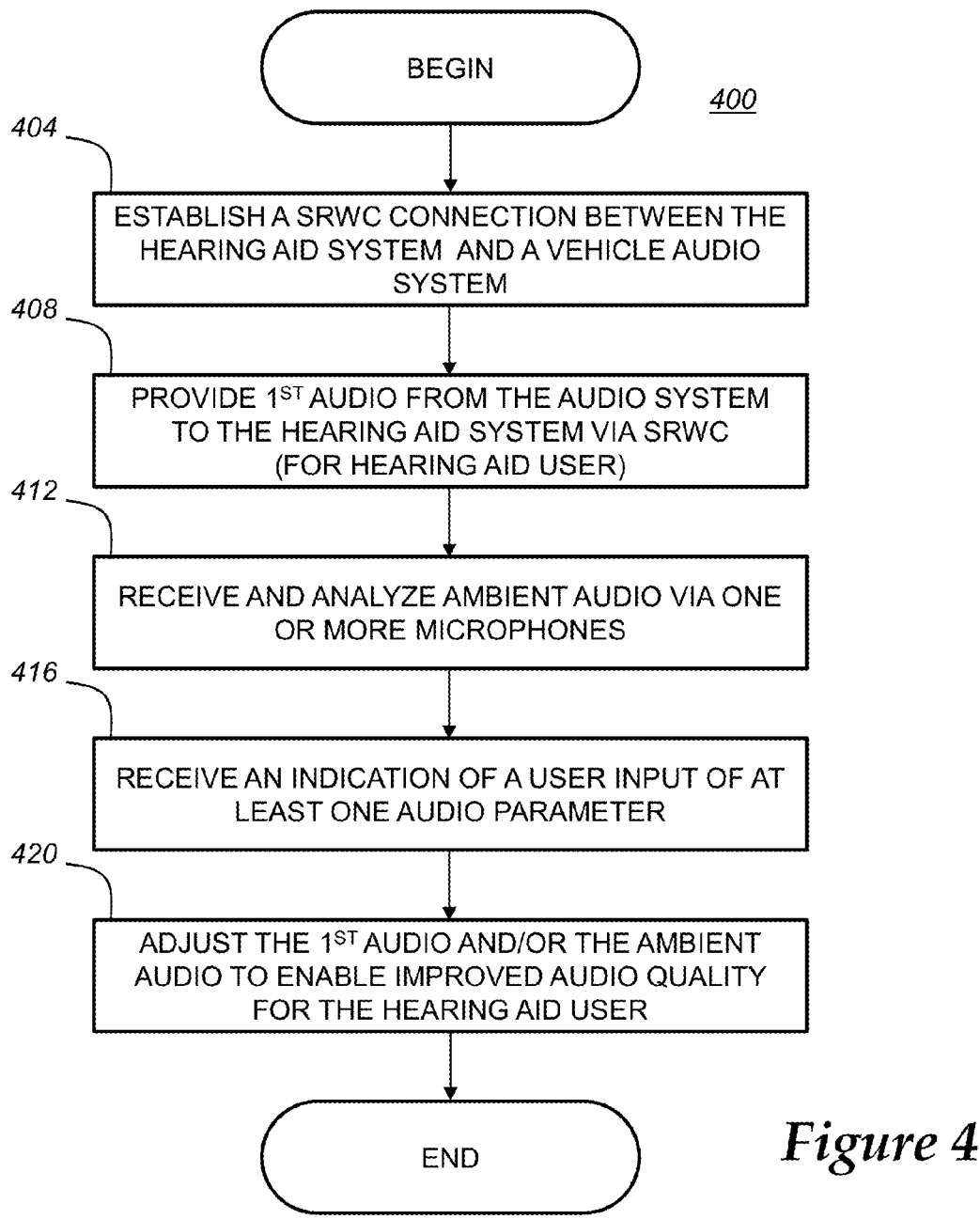
FIG. 4. is a flow diagram depicting one illustrative embodiment of a method of the present disclosure.

Turning to FIG. 4, a flowchart is depicted illustrating a method 400 of providing audio within the vehicle cabin 140 to the hearing aid system 120. The method begins with step 404 where a short range wireless communication (SRWC) connection is established between the hearing aid system 120 and the vehicle audio system 36. This may occur in a variety of ways; however, in at least one implementation, the VMU 100 may pair and connect via Bluetooth (or Wi-Fi Direct or any other suitable SRWC). The establishing step 404 also may include auto-reconnecting—e.g., when the user carrying the hearing aid system re-enters the vehicle at a later time. Such SRWC protocols are known to skilled artisans. In at least one embodiment, the VMU 100 pairs specifically with the remote device 124; in another embodiment, the remote device 124 is absent and the VMU 100 pairs directly with the hearing aid 122.

After step 404, the VMU 100 in step 408 may provide first or transmitted audio from the audio system 36 to the hearing aid system 120 using or via the SRWC. Thus, it will be appreciated that the transmitted audio may be transmitted as a wireless signal that is received by the hearing aid system 120, demodulated, de-encrypted (if desirable), converted from digital signals to analog signals, filtered, amplified, etc., and provided as an output via a speaker in the hearing aid 122 at an audible magnitude or volume level suitable to the vehicle user (e.g., a passenger). In at least one implementation, the audible volume level may be low enough to not be heard by other vehicle users (e.g., a driver). The transmitted audio may originate from the tuner 108 or player 110 and may include may be music, speech, one or more tones, etc. Skilled artisans will appreciate other various types or sources of the first audio.

The transmitted audio may be provided directly to the hearing aid 122 or may be provided to the remote device 124 which may then relay or facilitate transmitting the transmitted audio to the hearing aid 122 (e.g., by wire or wirelessly).

Before, after, and/or during step 408, the method 400 may perform step 412 wherein the VMU 100 receives (or detects) and analyzes second or ambient audio (e.g., from the vehicle occupants and audio system 36) within the vehicle cabin 140 (e.g., via one or more microphones 32). In at least one implementation, the ambient audio is at an audible volume level sufficient to be heard by any vehicle user located in or around the vehicle 12.

The analysis of ambient audio at the VMU 100 may include determining the energy of the ambient audio across multiple different frequency bands (ambient audio frequency analysis). The analysis further may comprise determining the energy of the transmitted audio across multiple different frequency bands (transmitted audio frequency analysis) and comparing the two frequency analyses. For at least some of the frequency bands, center frequencies and their respective bandwidths may also be identified. The analysis may account for additional factors as well—such as the "effective" amplification of both ambient and transmitted audio received by a hearing aid user in the vehicle; i.e., the effective decibel (dB) level or value received by the user as contributed by the hearing aid 122 which is located at or within the user's ear versus the speakers 102 which are spaced from the user.

In steps 408 and 412, it should be appreciated that the transmitted audio may or may not differ from the ambient audio. For example, where the driver is fitted with the hearing aid system 120, the transmitted audio from the VMU 100 to the hearing aid 122 may be traffic, weather, or navigation information, and the ambient audio may be music or entertainment-related audio that is provided from the VMU 100 to the speakers 102 and further include vehicle engine noise and passenger speech; however, this is merely one example—other implementations exist.

Following step 408 (and/or 412), the method may proceed to step 416. In step 416, the method 400 may receive an indication at the VMU 100 of a user input or adjustment of at least one audio parameter. Audio parameters may include a frequency parameter, an energy parameter (e.g., of a selected frequency band), or a volume (gain) parameter. It should be appreciated that raising/lowering the gain of an audio signal amplifies/de-amplifies all of the frequencies, whereas adjusting an energy parameter of a frequency either amplifies or de-amplifies only that particular frequency band. In one implementation, the user input may adjust controls 34 of the VMU or the equalizer altering the transmitted audio to the hearing aid system 120, to the speakers 102, or both.

In at least one embodiment, the user input of at least one audio parameter is a suppression input for the hearing aid user. The suppression input may be an indication to the VMU 100 that the user desires to improve his/her audio quality via the hearing aid system 120 in view of the ambient audio (or noise) in the cabin. The suppression input may be a toggle input or a sliding or tunable scale input. Thus, using the suppression input, the user may allow the VMU 100 to adjust one or more audio parameters in order to achieve a desirable audio quality at the hearing aid 122. In another embodiment, the suppression input is actuated by the user's voice (e.g., using known techniques of automatic speech recognition or ASR).

For example, following step 416, the user and/or the VMU 100 may perform step 420 by adjusting the transmitted audio received by the hearing aid user, adjusting the ambient audio received by the hearing aid user, or both. For example in step 420, the hearing aid user may use the controls of the VMU 100 and/or equalizer 112 to manually tune parameters of the transmitted and ambient audio to an acceptable audio quality at the hearing aid 122. Or the VMU 100 may receive the suppression input and perform step 420 using the frequency analysis (or analyses) discussed in step 412 (e.g., controlling the equalizer 112).

Where the VMU 100 performs step 420, the VMU may predict or project the audio parameter adjustments which will most suitably improve the user's audio quality based on empirical data or predictive data stored in memory 104. Of course, where the suppression input is scalable, one or more sliding scale-type controls 34 may be used by the hearing aid user to adjust or fine-tune the audio quality following the VMU's. For example, based on the frequency analyses, the VMU 100 may determine it is desirable to raise the effective gain at the hearing aid 122 (amplify the transmitted audio), suppress or lower the effective gain of speaker audio in the cabin, suppress or lower the effective gain of speaker audio near the hearing aid user (described more fully below), suppress one or more frequency energies of the speaker audio (e.g., near the hearing aid user), suppress all the ambient audio (e.g., near the hearing aid user) using the noise suppression system 50, or any combination of the previously examples.

In order to perform step 420, the VMU 100 may utilize a variety of devices within the vehicle 12 using its processor 106 and memory 104. For example, the VMU may adjust (e.g., increase) the gain of the transmitted audio to the hearing aid 122; or the VMU may suppress the gain delivered to the speakers 102; or the VMU may suppress the gain delivered near the hearing aid user (e.g., as described below, the user may be identified via the sensors 132 and/or their respective VSMs 42). Or for example, the VMU 100 may suppress one or more frequency energies of the speaker audio nearest the hearing aid user by controlling the equalizer 112 and speakers; or the VMU may suppress all ambient audio near the hearing aid user using noise or audio canceling techniques (known to skilled artisans) by controlling the suppression system 50. The control of these techniques may be used singly or in combination by the VMU 100 in order to positively affect the audio quality experienced by the hearing aid user; more specifically, the VMU may improve the audio quality of the first audio to the hearing aid in light of the ambient audio in the vehicle cabin 140. It has been disclosed that, in some instances, the VMU 100 may suppress speaker gain near the hearing aid user, or suppress one or more frequency energies near the hearing aid user, or perform audio cancelation techniques near the hearing aid user. Each of the instances includes identifying the location in the cabin 140 where the hearing aid user is situated. This is described below.

The VMU 100 may determine an occupant-location profile based on the location of the occupant wearing or carrying the hearing aid system 120. In one embodiment, the VMU 100 may communicate by wire (e.g., bus 44) or wirelessly (e.g., SRWC) with the sensors 132. Ultimately, the VSM 42 may determine within which zone A, B, C, D, or E the hearing aid system 120 is. The techniques used to determine the location of a wireless device (such as the hearing aid system 120) in the vehicle 12 are known. Other techniques are also possible; e.g., the location or zone may be provided manually (e.g., via the VMU 100).

The occupant-location profile may be saved in VMU memory 104. The profile may suitably identify multiple zones having hearing aid systems 120; e.g., if more than one occupant wears the hearing aid systems 120, this process could be duplicated for each hearing aid user.

Alternative embodiments of the method 400 may include controlling the audio quality of the hearing aid 122 via a mobile device 96. The mobile device may be in communication with the VMU 100 via wired or a SWRC link; the mobile device may receive adjustments by the hearing aid user and communicate this to the VMU, and in some implementations, the software to control the VMU 100 and/or the equalizer 112 may be implemented in the mobile device 96.

Mobile devices are generally known and may include any electronic device suitable for making cellular communications, SRWC communications, wired or tethered communications, or any combination thereof. Non-limiting examples include: include a cellular telephone, a personal digital assistant (PDA), a Smart phone, a personal laptop computer or tablet computer having two-way communication capabilities, a netbook computer, and a notebook computer.

Thus, there has been described several embodiments of a vehicle audio system that provides audio to a vehicle user's hearing aid. The vehicle audio system may control audio parameters within the vehicle cabin and may amplify or de-amplify, as desirable, the gain and various frequencies bands of the hearing aid as well as the gain and various frequencies bands of the speaker audio (e.g., near the hearing aid user). In addition, in order to improve the audio quality of the audio transmitted to the hearing aid user's ear, active audio suppression may be used.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing audio within a vehicle cabin compartment to a hearing aid system, comprising the steps of:
   establishing a wireless connection via short range wireless communication (SRWC) between the hearing aid system and a vehicle audio system;
   transmitting audio signals via the SRWC connection to the hearing aid system;
   receiving vehicle cabin compartment audio at the vehicle audio system;
   conducting audio analysis of the transmitted audio signals;
   conducting audio analysis of the received cabin compartment audio; and
   based on a comparison of the two analyses, controlling from the vehicle audio system at least one characteristic of audio signals subsequently transmitted to the hearing aid system via the SRWC connection.

2. The method of claim 1, wherein the controlling step comprises amplifying audio received by a user of the hearing aid system or wherein the controlling step further comprises suppressing cabin compartment audio, controlling cabin loudspeaker audio, or both.

3. The method of claim 2, wherein the controlling of loudspeaker audio or the suppressing of cabin compartment audio is localized within an occupant zone of the cabin compartment.

4. A method of providing audio within a vehicle cabin compartment to a hearing aid system, comprising the steps of:
   establishing a wireless connection via short range wireless communication (SRWC) between the hearing aid system and a vehicle audio system;
   providing first audio from the audio system to the hearing aid system via the SRWC;
   detecting second audio within the cabin compartment of the vehicle;
   receiving an indication of a user input of an audio parameter in the vehicle; and
   suppressing at least a portion the second audio based on the indication.

5. The method of claim 4, wherein the suppressing step further comprises suppressing the gain of the second audio.

6. The method of claim 5, wherein the suppressed gain of the second audio is near the hearing aid user.

7. The method of claim 4, wherein the suppressing step further comprises suppressing a frequency energy of at least a portion of the second audio.

8. The method of claim 5, wherein the suppressed frequency energy is near the hearing aid user.

9. A method of providing audio to a hearing-impaired device proximate to a vehicle, comprising the steps of:
   establishing a wireless connection via short range wireless communication (SRWC) between the hearing aid system and a vehicle audio system; and
   providing first audio from the audio system to the hearing aid system via the SRWC;
   providing second audio from the audio system to the cabin compartment of the vehicle;
   receiving background audio and the second audio at the audio system via one or more microphones in the vehicle; and
   adjusting at least one of the first audio, the second audio, or the background audio in order to improve the audio quality perceived by a user of the hearing aid system in the vehicle.

10. The method of claim 9, wherein the adjusting step further comprises suppressing at least a portion of the second audio or the background audio.

11. The method of claim 10, wherein the suppressing step includes suppressing the gain of the second audio.

12. The method of claim 11, wherein the suppressed gain of the second audio is near the hearing aid user.

13. The method of claim 10, wherein the suppressing step includes suppressing a frequency energy of at least a portion of the second audio or the background audio.

14. The method of claim 13, wherein the suppressed frequency energy of the second audio or background audio is near the hearing aid user.

* * * * *